US009855901B1

(12) United States Patent
Reiners et al.

(10) Patent No.: US 9,855,901 B1
(45) Date of Patent: Jan. 2, 2018

(54) FLANGE FOR EXTERIOR ORNAMENTATION

(71) Applicant: FORD GLOBAL TECHNOLOGIES, LLC, Dearborn, MI (US)

(72) Inventors: Robert Reiners, Grosse Ile, MI (US); Thomas F. Boettger, Dearborn, MI (US); David Mahlmeister, Clinton Township, MI (US); Michael Rosebrook, Sterling Heights, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 20 days.

(21) Appl. No.: 15/245,672

(22) Filed: Aug. 24, 2016

(51) Int. Cl.
*B60R 13/04* (2006.01)
*B62D 25/02* (2006.01)
*B62D 65/16* (2006.01)

(52) U.S. Cl.
CPC ............ *B60R 13/04* (2013.01); *B62D 25/02* (2013.01); *B62D 65/16* (2013.01)

(58) Field of Classification Search
CPC ............ B60K 15/04; B60K 15/0406; B60K 15/03519; B60K 15/05; C08L 2666/02; C08L 53/00; C08L 77/00; Y10S 220/33; B60R 13/04; B62D 25/02; B62D 65/16
USPC ...... 296/161, 97.22; 137/587, 588; 220/86.2
See application file for complete search history.

(56) References Cited

U.S. PATENT DOCUMENTS

| 4,573,694 | A | | 3/1986 | Goto et al. | |
|---|---|---|---|---|---|
| 5,906,406 | A | * | 5/1999 | Pajakowski | B60K 15/05 220/86.2 |
| 6,026,554 | A | | 2/2000 | Parker | |
| 6,508,501 | B1 | * | 1/2003 | Meinke | B60K 15/05 220/297 |
| 8,162,375 | B2 | | 4/2012 | Gurtatowski et al. | |
| 2005/0012280 | A1 | * | 1/2005 | Richardson | B60R 13/06 277/628 |
| 2008/0136210 | A1 | * | 6/2008 | Scott | B60K 15/04 296/97.22 |
| 2008/0237230 | A1 | * | 10/2008 | Och | B60K 15/04 220/86.2 |
| 2009/0102433 | A1 | * | 4/2009 | Kamaga | B60L 3/0069 320/165 |

(Continued)

FOREIGN PATENT DOCUMENTS

| DE | 3301072 A1 | 7/1984 |
|---|---|---|
| WO | 2012119172 A1 | 9/2012 |
| WO | 2015028863 A1 | 3/2015 |

OTHER PUBLICATIONS

English Machine Translation of WO2012119172A1.
English Machine Translation of DE3301072A1.

*Primary Examiner* — Kiran B Patel
(74) *Attorney, Agent, or Firm* — Jason Rogers; King & Schickli PLLC

(57) ABSTRACT

A fuel filler housing opening includes a segmented flange for attachment of a fuel filler housing. A fuel filler housing opening insert is provided, configured for attaching to the segmented flange. The fuel filler housing opening insert includes a body surrounding a central opening dimensioned to receive a fuel filler housing therethrough. The body may be dimensioned to fully overlay the fuel filler housing opening segmented flange. The fuel filler housing opening insert body includes one or more retainers configured for capturing the segmented flange.

20 Claims, 3 Drawing Sheets

(56) References Cited

U.S. PATENT DOCUMENTS

| | | | |
|---|---|---|---|
| 2009/0235567 A1* | 9/2009 | Aitken | B60K 15/04 40/591 |
| 2009/0309386 A1* | 12/2009 | Yamamoto | B60K 15/0406 296/97.22 |
| 2010/0072774 A1* | 3/2010 | Bar | B60K 15/0406 296/97.22 |
| 2011/0132905 A1* | 6/2011 | Ognjanovski | B60K 15/0406 220/86.2 |
| 2013/0088032 A1* | 4/2013 | Hara | B60R 19/48 296/1.07 |
| 2013/0206757 A1* | 8/2013 | Nagai | B60K 15/0406 220/86.2 |
| 2013/0249235 A1 | 9/2013 | Lorenc et al. | |
| 2014/0059932 A1* | 3/2014 | Zia | B60K 15/04 49/279 |
| 2014/0284329 A1* | 9/2014 | Frank | B60K 15/03006 220/86.2 |
| 2014/0332530 A1* | 11/2014 | Groom | B60K 15/04 220/86.2 |
| 2015/0048644 A1* | 2/2015 | Georgi | B60K 15/05 296/97.22 |
| 2015/0151632 A1* | 6/2015 | Fujiwara | B60K 15/04 220/86.2 |
| 2015/0217638 A1* | 8/2015 | Chiba | B60K 15/05 296/97.22 |
| 2015/0232321 A1* | 8/2015 | Schroeder | B67D 7/3209 141/208 |
| 2016/0101686 A1* | 4/2016 | Brown | B60K 15/05 296/97.22 |
| 2016/0250920 A1* | 9/2016 | Hagano | B60K 15/04 220/86.2 |
| 2016/0272478 A1* | 9/2016 | Sekihara | B60K 15/04 |
| 2017/0197515 A1* | 7/2017 | Southey | B60L 11/1818 |

* cited by examiner

FLANGE FOR EXTERIOR ORNAMENTATION

TECHNICAL FIELD

This disclosure relates generally to motor vehicles fuel filler housings. More particularly, the disclosure relates to to a fuel filler housing opening insert for attaching to a body panel fuel filler housing opening.

BACKGROUND

Currently, many vehicle body parts such as body panels are manufactured by a stamping process. For malleable metals such as aluminum, imperfections such as splits created during the stamping process are a concern.

For example, during the manufacture of a side body panel including a fuel filler housing opening typically a flange is created to allow attachment of an ornamental fuel housing thereto. This provides a recessed mounting surface disposed surrounding the fuel filler opening for attachment of a hinged fuel filler door, whereby when closed the fuel filler door is flush with a side of the body panel. During the manufacture of such parts by stamping processes, it was found that the flange created was prone to splitting. To reduce this tendency to split, it was found that the created flange length dimension had to be reduced. However, the reduced length flange then required a reduced size of attachment clips used for attaching the fuel filler housing to the flange, reducing the strength of the attachment and causing aesthetic issues leading to consumer dissatisfaction.

Accordingly, a need is identified in the art for improvements to devices for attaching fuel filler housings to fuel filler housing openings, particularly in body panels made of malleable metals such as aluminum. To address this identified need, the present disclosure is directed to a fuel filler housing opening insert for attaching to a body panel fuel filler housing opening.

SUMMARY

In accordance with the purposes and benefits described herein and to solve the above-summarized and other problems, in one aspect a vehicle body panel assembly is provided, comprising a fuel filler housing opening including a segmented flange for attachment of a fuel filler housing and a fuel filler housing opening insert configured for attaching to the segmented flange. The fuel filler housing opening insert includes a body surrounding a central opening dimensioned to receive a fuel filler housing therethrough. The fuel filler housing opening insert comprises one or more retainers configured for capturing the segmented flange.

In embodiments, the fuel filler housing opening insert comprises a plurality of retainers for capturing the segmented flange in a snap-fit connection. The fuel filler housing opening insert body may be dimensioned to fully overlay the fuel filler housing opening segmented flange. In embodiments, fuel filler housing opening insert is fabricated of one or more of a plastic, a polymer, a metal, a glass-filled polymer, and combinations thereof.

In another aspect of the disclosure, a vehicle body panel assembly is provided, comprising a plurality of body panels including at least one body panel that is a side body panel comprising a fuel filler housing opening including a segmented flange for attachment of a fuel filler housing. A fuel filler housing opening insert as described above is provided, configured for attaching to the segmented flange.

In yet another aspect, a method for attaching a vehicle fuel filler housing to a fuel filler housing opening in a vehicle side body panel is provided, comprising providing a side body panel comprising a fuel filler housing opening including a segmented flange for attachment of a fuel filler housing. Next is a step of providing a fuel filler housing opening insert as described above, followed by pressing the fuel filler housing opening insert onto the segmented flange to provide a snap-fit connection. A fuel filler housing may then be attached to the fuel filler housing opening insert body.

In the following description, there are shown and described embodiments of the fuel filler housing opening insert. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed fuel filler housing opening insert, and together with the description serve to explain certain principles thereof. In the drawing.

Reference will now be made in detail to embodiments of the disclosed fuel filler housing opening insert, examples of which are illustrated in the accompanying drawing figures wherein like reference numerals indicate like features.

DETAILED DESCRIPTION

Figure 1:
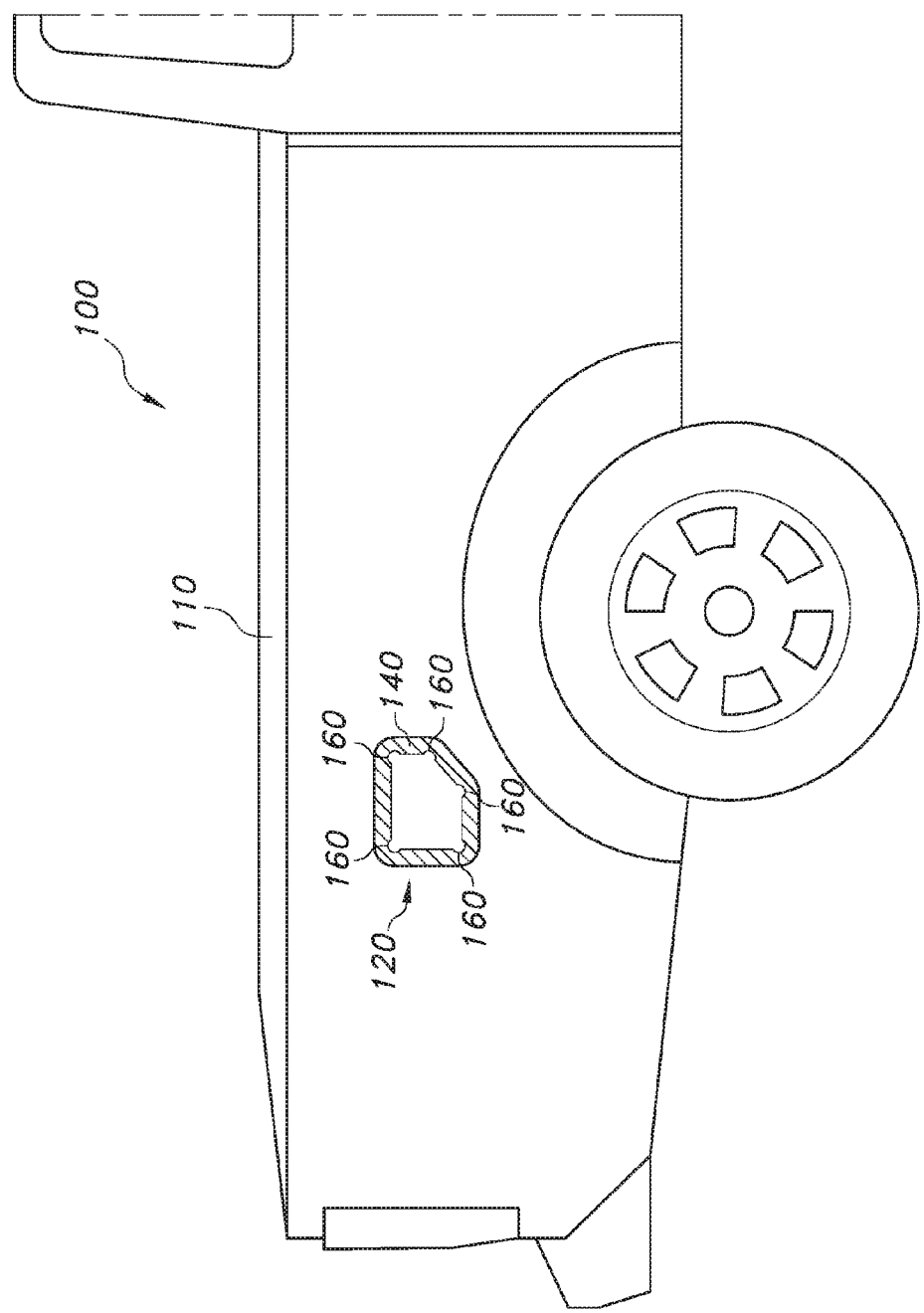
FIG. 1 shows a representative fuel filler housing opening in a vehicle body panel.

With reference to FIG. 1, as summarized above during the manufacture by metal stamping processes of vehicle 100 body parts such as side body panels 110 including fuel filler housing openings 120 it was found that the stamping process tended to cause splits in fragile portions of the body panel such as the corners of the flange 140 created for attachment of a fuel filler housing (not shown). To address this problem, as shown in the drawing figure a fuel filler housing opening 120 including a flange 140 comprising notches 180 at each bend in the flange was provided (i.e. a gapped or segmented flange 140 rather than a conventional continuous flange). Unfortunately, as noted above this created an unsatisfactory attachment point for the fuel filler housing. Moreover, the notches 180 were visible after attachment of the fuel filler housing, causing aesthetic issues and customer dissatisfaction.

Figure 2:
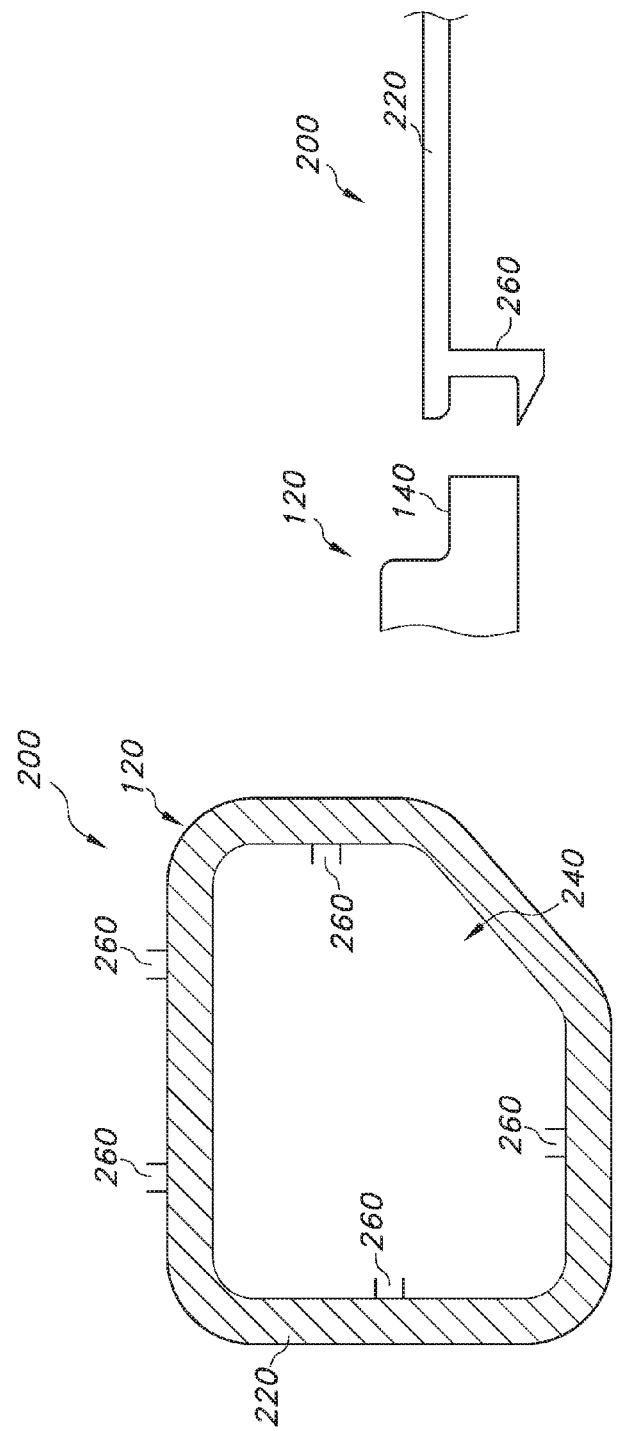
FIG. 2A shows a fuel filler housing opening insert according to the present disclosure.
FIG. 2B shows a retainer for attaching the fuel filler housing opening insert of FIG. 2A to the fuel filler housing opening of FIG. 1.

To solve this problem, with reference to FIG. 2A a fuel filler housing opening insert 200 is provided, having a body 220 and a central opening 240 whereby a flange surface is defined. As will be appreciated, the fuel filler housing opening insert 200 defines an exterior dimension substantially corresponding to an interior dimension of the fuel filler housing opening 120/flange 140 as shown in FIG. 1. The fuel filler housing opening insert 200 further includes one or more retainers 260 configured for capturing flange 140. The retainers 260 are configured to provide a sufficient amount of holding force, without requiring excessive installation effort. In the depicted embodiment, retainers 260 are flexible hooks configured for attaching the fuel filler housing opening insert 200 to the flange 140 by a convenient snap-on fit (see FIG. 2B), and may be fabricated of any suitable material including without intending any limitation metals, plastics, polymers, steels, and combinations. However, use of any suitable retainer 260 is contemplated.

Use of any suitable material for fabrication of the fuel filler housing opening insert 200 is contemplated including without intending any limitation plastics, polymers, metals, fiberglass, and composites thereof. In embodiments, the fuel filler housing opening insert 200 is fabricated of a suitably lightweight material, such as plastics, polymers, metals, glass-filled polymers such as nylons, composite materials including carbon fiber, KEVLAR®, and others.

Figure 3:
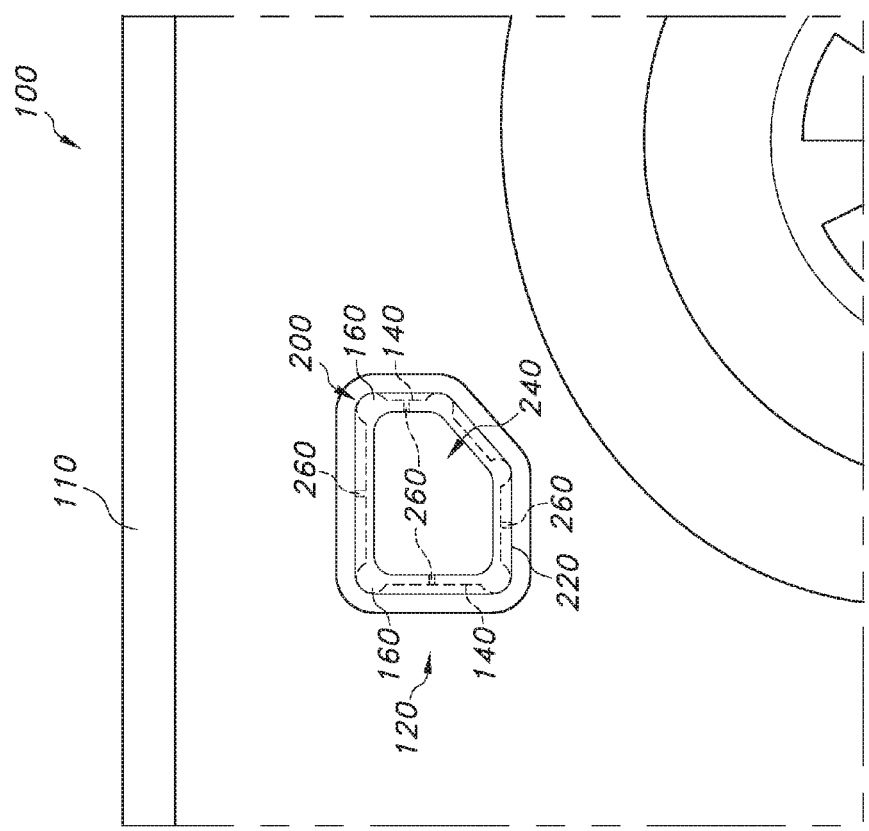
FIG. 3 shows the fuel filler housing opening insert of FIG. 2A assembled to the fuel filler housing opening of FIG. 1.

In use, the fuel filler housing opening insert 200 attaches to the flange 140 by way of retainers 260 as shown in FIG. 3, simply by pressing the fuel filler housing opening insert 200 onto the flange 140 whereby the retainers capture the flange in a snap-fit. As will be appreciated, by this attachment an increased flat surface is provided for attachment of a fuel filler housing, allowing a more secure attachment. In turn, the entirety of the interrupted flange 140 and notches 160 are overlain by the fuel filler housing opening insert body 220, this improving aesthetics and customer satisfaction.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle body panel assembly, comprising:
    a fuel filler housing opening including a segmented flange for attachment of a fuel filler housing; and
    a fuel filler housing opening insert configured for attaching to the segmented flange.

2. The vehicle body panel assembly of claim 1, wherein the fuel filler housing opening insert includes a body surrounding a central opening dimensioned to receive a fuel filler housing therethrough.

3. The vehicle body panel assembly of claim 2, wherein the fuel filler housing opening insert comprises one or more retainers configured for capturing the segmented flange.

4. The vehicle body panel assembly of claim 3, wherein the fuel filler housing opening insert comprises a plurality of retainers for capturing the segmented flange.

5. The vehicle body panel assembly of claim 4, wherein the plurality of retainers are configured for capturing the segmented flange in a snap-fit connection.

6. The vehicle body panel assembly of claim 2, wherein the fuel filler housing opening insert body is dimensioned to fully overlay the fuel filler housing opening segmented flange.

7. The vehicle body panel assembly of claim 5, wherein the fuel filler housing opening insert is fabricated of one or more of a plastic, a polymer, a metal, a glass-filled polymer, and combinations thereof.

8. A vehicle including the vehicle body panel assembly of claim 1.

9. A vehicle body panel assembly, comprising:
    a plurality of body panels, wherein at least one body panel is a side body panel comprising a fuel filler housing opening including a segmented flange for attachment of a fuel filler housing; and
    a fuel filler housing opening insert configured for attaching to the segmented flange.

10. The vehicle body panel assembly of claim 9, wherein the fuel filler housing opening insert includes a body surrounding a central opening dimensioned to receive a fuel filler housing therethrough.

11. The vehicle body panel assembly of claim 10, wherein the fuel filler housing opening insert comprises one or more retainers configured for capturing the segmented flange.

12. The vehicle body panel assembly of claim 11, wherein the fuel filler housing opening insert comprises a plurality of retainers for capturing the segmented flange.

13. The vehicle body panel assembly of claim 12, wherein the plurality of retainers are configured for capturing the segmented flange in a snap-fit connection.

14. The vehicle body panel assembly of claim 10, wherein the fuel filler housing opening insert body is dimensioned to fully overlay the fuel filler housing opening segmented flange.

15. The vehicle body panel assembly of claim 14, wherein the fuel filler housing opening insert is fabricated of one or more of a plastic, a polymer, a metal, a glass-filled polymer, and combinations thereof.

16. A vehicle including the vehicle body panel assembly of claim 9.

17. A method for attaching a vehicle fuel filler housing to a fuel filler housing opening in a vehicle side body panel, comprising:
    providing a side body panel comprising a fuel filler housing opening including a segmented flange for attachment of a fuel filler housing;
    providing a fuel filler housing opening insert configured for attaching to the segmented flange, the fuel filler housing opening insert comprising a plurality of snap-fit retainers configured for capturing the segmented flange; and
    pressing the fuel filler housing opening insert onto the segmented flange to provide a snap-fit connection.

18. The method of claim 17, including providing the fuel filler housing opening insert including a body surrounding a central opening dimensioned to receive a fuel filler housing therethrough.

19. The method of claim 18, including providing the fuel filler housing opening insert body dimensioned to fully overlay the fuel filler housing opening segmented flange.

20. The method of claim 17, further including attaching a fuel filler housing to the fuel filler housing opening insert body.

* * * * *